Nov. 29, 1955  E. J. GORNOWSKI ET AL  2,725,341
FLUID HYDROFORMING
Filed Nov. 1, 1952
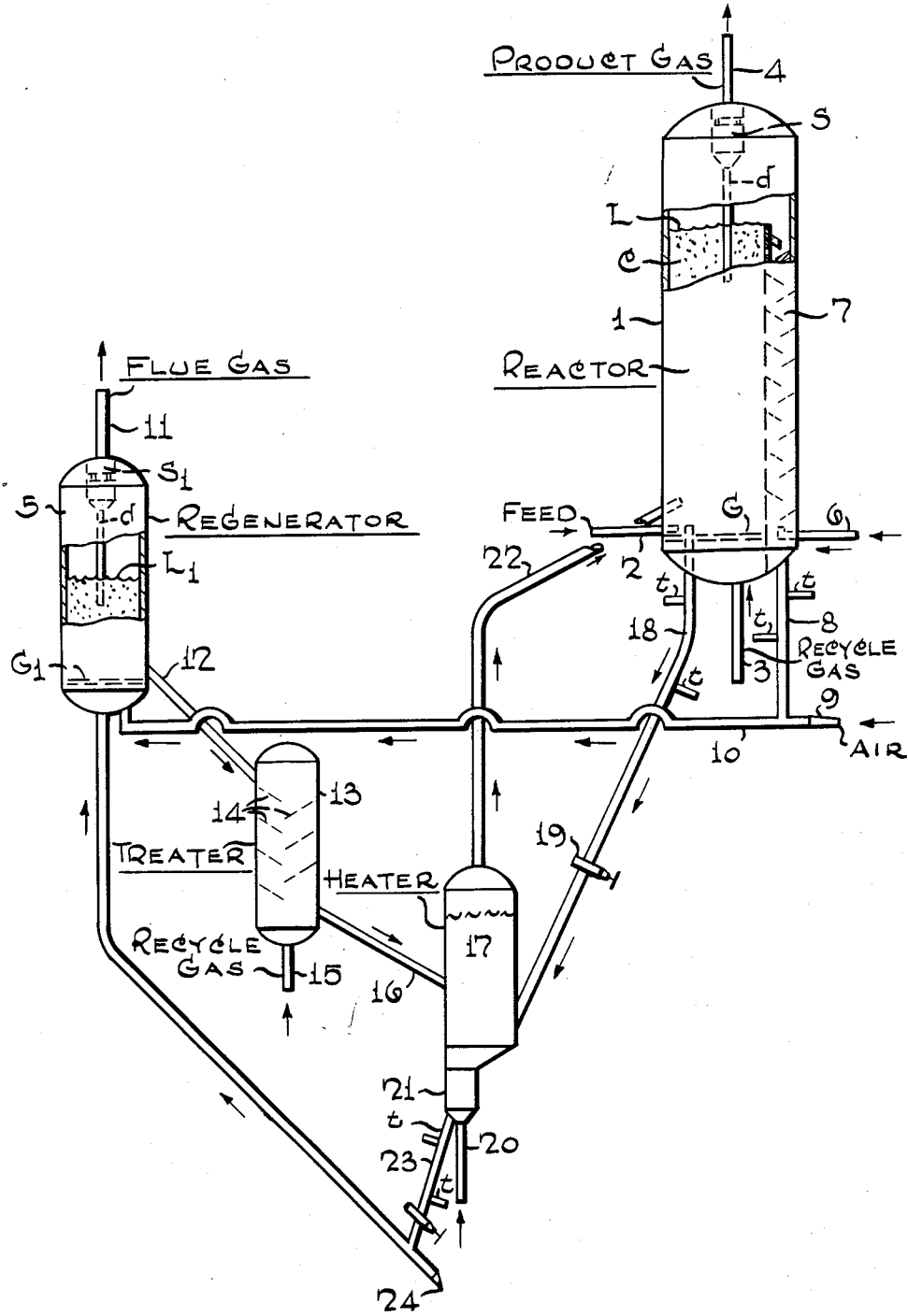
Edward J. Gornowski  Inventors
Wilson C. Rich Jr.
By J. Cashman Attorney he# United States Patent Office 2,725,341
Patented Nov. 29, 1955

2,725,341

FLUID HYDROFORMING

Edward J. Gornowski, Cranford, and Wilson C. Rich, Jr., Mountainside, N. J., assignors to Esso Research and Engineering Company, a corporation of Delaware Application November 1, 1952, Serial No. 318,266

12 Claims. (Cl. 196—50.2)

The present invention relates to improvements in the catalytic reforming of naphthas employing a fluidized bed of hydroforming catalyst. More particularly, the present invention relates to improvements in supplying the heat to the hydroforming reaction.

Hydroforming is usually defined as an operation in which a naphthene-containing naphtha is contacted at elevated temperatures and pressures from atmospheric to about 500 p. s. i. g. in the presence of added hydrogen with a solid contact material. The process results in no net consumption of hydrogen, and, as a matter of fact, there is invariably a net production of hydrogen. As to the chemistry of the process, the naphthenes in the naphtha feed are dehydrogenated to form the corresponding aromatics, five-membered carbo-cyclics, such as dimethylcyclopentane undergo rearrangement to form methylcyclohexane, straight chain paraffins present in the feed undergo rearrangement to form branch chained paraffins, and there is also some hydrocracking of paraffins.

The feed to the hydroforming reaction is usually one boiling substantially within the range of from about 200°–400° F., and when properly carried out, the amount of dry gas formed is of the order of 10 vol. percent based on feed, and the coke formed does not exceed about 2 wt. percent based on feed. The product usually referred to as the hydroformate is still in the gasoline boiling range.

As heretofore indicated, the present process relates to improvements in supplying heat to the reaction, which reaction is highly endothermic. Heretofore, the heat has been supplied to the reactor by (1) preheating the feed, (2) in the fluid system comprising a reaction zone and a catalyst regenerating zone, heat is transferred from the regeneration zone to the reaction zone in the form of sensible heat of the newly regenerated catalyst, and (3) the "recycle gas," that is to say, the hydrogen-containing gas is preheated and fed to the reaction zone at a temperature of 1000°–1200° F.

Now there are serious drawbacks to the foregoing methods of adding heat to the reaction zone. With respect to the preheat supply in the feed, care must be taken to avoid thermal cracking and, therefore, degradation of the feed during the preheat. Generally the feed can not safely be heated to above about 1000° F. With respect to the heat carried into the reactor from the regenerator as sensible heat of the catalyst, it is pointed out that there is a limitation on this also due to the fact that freshly regenerated catalyst produces carbon in the reactor. The economics of the process are such that it is desirable to limit the circulation of catalyst to rates below those necessary to transfer all of the regeneration heat into the reactor and thus improve yields. Therefore, during regeneration heat must be abstracted from the catalyst by cooling to protect the catalyst from injury by overheating and, hence, not all of the heat available in the regenerator can be utilized and transferred to the reaction zone. With respect to reheating of the recycled gas, it is pointed out that since this hydrogen gas is cooled in the product recovery system to a relatively low temperature, it is necessary to supply additional equipment and fuel to reheat this hydrogen-containing gas. Further, the $C_4+$ hydrocarbons contained in the recycle gas are also subject to thermal degradation at temperatures in the order of 1200° F.

The present invention provides a feasible and inexpensive method of overcoming the aforementioned insufficiencies of prior practice leading to supplying the heat requirements for the highly endothermic hydroforming reaction, and also supplies further advantages as will more fully appear hereinafter.

The main object of the present invention is to provide cheap and efficient means for supplying heat to the hydroforming reaction.

Another object of the present invention is to recover from the catalyst regeneration zone of a fluid hydroforming system all of the available heat released therein during the regeneration and to supply the thus recovered heat substantially in its entirely to the hydroforming zone.

Another object of the present invention has reference to the operation of the catalyst regeneration zone in a manner such that limiting the temperature rise of the said catalyst during the regeneration, to protect it from injury, does not result in withdrawal of heat from the system.

Another object of the present invention is to transfer heat from the regeneration zone to the reaction zone by means of a circulating shot stream under conditions such that the said shot does not enter the reactor and possibly give adverse catalytic action on the feed, nor take up expensive reactor volume.

Other and further objects of the present invention will appear more fully hereinafter.

In brief compass, the present invention involves operating a two vessel system comprising a fluid catalyst reactor and a fluid catalyst regenerator in such a manner that heat released during regeneration is transferred to the reactor catalyst through the agency of the circulating shot in an intermediate zone, and the catalyst thus heated is separated from the shot and returned to the reaction zone while the thus cooled shot is returned to the regeneration zone for reheating. By thus operating, the shot never contacts the oil, and consequently, the danger of causing degradation of the feed by contact with the shot is avoided. Moreover, substantial quantities of catalyst are circulated from the reactor to the heater and back again to the reactor without being subjected to the adverse effects of the air and other regeneration gases.

In the accompanying drawing, there is shown a diagrammatic representation of the essential elements of an apparatus layout in which a preferred modification of the present invention may be carried into effect.

Referring in detail to the drawing, 1 represents a hydroforming reactor in which there is disposed a fluidized bed of catalyst C extending from a grid or other gas distributing means G to an upper dense phase level L. The catalyst is in the form of a powder of a fluidizable size and may comprise any known hydroforming catalyst composition, such as 10 wt. percent molybdenum oxide carried on 90 wt. percent of alumina. Of course, the molybdenum oxide is the active component in the example just now referred to, whereas, the alumina is a spacing agent or base. It will be understood that many other metal oxides, such as chromium oxide, vanadium oxide, etc. may be used in lieu of molybdenum oxide. Furthermore, platinum group metal may be used instead of the metallic oxides mentioned as, for example, ½ or 1 wt. percent platinum carried on 99 to 99½ wt. percent of alumina, or other carrier. Palladium may also be used instead platinum. It is also pointed out that the catalyst base may contain 1–5 wt. percent of a heat stabilizing component, such as silica, in other words, in the case of molybdenum oxide, the catalyst composition may comprise 10 wt. percent of molybdenum oxide, 85 wt. percent alumina and 5 wt. percent of silica. The platinum-containing catalyst may also have its spacing agent improved by the inclusion therein of a minor amount of silica, and the platinum-containing catalyst may be further improved by treatment with HF, chlorine, or various other halogens or halides.

Referring again to the reactor 1, a suitably preheated feed, usually a virgin naphtha containing a substantial quantity of naphthenes fed to the reactor after suitable preheating in means not shown, is charged to the bottom of the reactor through line 2. In general, however, it is preferable to feed the naphtha to the reactor at a point in close proximity to the grid G but above the latter. Simultaneously, recycle gas preheated to a temperature of 1000°–1200° F., which recycle gas is obtained from the product recovery system by suitable means (not shown), is fed to the reactor through line 3 and passes upwardly through the grid into contact with the catalyst and the naphtha feed. The superficial velocity of this gasiform mixture is so controlled under known conditions as to cause the said catalyst, which has a particle size of from 20–200 microns, to be formed into a fluidized bed. Also, under conditions of temperature, pressure and contact time more fully set forth hereinafter, the desired conversion occurs and the crude product is drawn overhead through line 4. This crude product is subjected to cooling and fractionation in conventional equipment to recover the hydroformate in equipment not shown. As the vapor form product issues from the dense bed, which has an upper level at L, it is in the form of a light phase disposed between L and the top of the reactor. Since this light phase contains entrained catalyst, it is conventional practice to cause this suspension to flow through one or more gas-solids separating devices, such as "cyclones" S wherein entrained catalyst is separated from the gasiform or vapor form material and returned to the dense bed through one or more dip pipes $d$.

Since, as previously indicated, the catalyst acquires carbonaceous and other deposits during the reaction in reactor 1, it is withdrawn from the reactor and conducted to a regenerator 5 in a manner presently described. However, prior to the withdrawal of the catalyst from the reactor, it is treated with a purging gas to strip out hydrocarbons, and to this end, therefore, the catalyst is caused to flow from the bed C into a stripping zone 7 where it flows countercurrently downwardly against an upflowing gas which is charged to a lower point of the stripping zone through line 6. This stripping gas may be any inert gas, such as nitrogen, flue gas, etc., but preferably, is steam, since the latter is readily separated from the other gasiform material by cooling below the condensation temperature of the said steam. The stripped catalyst is withdrawn from the reactor through line 8 and charged into a line 9 which contains a stream of air, and in which stream of air the catalyst is suspended, and in this form carried via line 10 into regenerator 5. The drawoff pipe 8 is provided with a plurality of gas taps $t$ through which an aerating gas may be introduced to improve the fluidity of the flowing catalyst.

As previously indicated, the heart of the present invention goes to the manner of recovering heat from the regenerator and supplying it to the reactor, which method will be described in detail. The catalyst in regenerator 5 is mixed with shot, that is to say, a material having a particle size of from 400–600 microns. This material may comprise copper, iron, or various other metals or metal compounds. It may also include mullite or alumina. The mixture of catalyst and shot is formed into a dense, fluidized bed or suspension in the regenerator 5 in precisely the same manner as the catalyst is formed into a suspension in reactor 1, namely, by controlling the particle size of the shot and the catalyst responsive to the superficial velocity of the gas passing therethrough. This suspension extends from gas distributing means $G_1$ to an upper dense phase level $L_1$. Under conditions more fully set forth hereinafter, the contaminating deposits on the catalyst are removed by treatment with oxygen-containing gas, and the fumes after passing through one or more cyclones S, are withdrawn from the regenerator through line 11 and rejected from the system. Of course, the heat content of these flue gases may be utilized in the plant to conserve their heat energy. Entrained catalyst separated in the cyclone S, is returned to the dense bed through one or more dip pipes $d$. A mixture of catalyst and shot is withdrawn from the regenerator through a line 12 and charged to a pretreater 13. In pretreater 13, the catalyst passes downwardly over baffles 14 against an upflowing stream of recycle gas, which is charged to the bottom of the pretreater through line 15. The purpose of this treatment is to condition the catalyst when its active component is a metal oxide as, say, in the case of molybdenum oxide carried on alumina. There are several ways of conditioning the catalyst other than that described and illustrated, and this particular feature of the invention does not go to the heart thereof. In some cases this pretreating of the regenerated catalyst may be omitted. The pretreated catalyst admixed with the shot is withdrawn from the pretreater 14 at a point near the bottom thereof through line 16 and charged to a heater 17. Simultaneously, additional catalyst is withdrawn from reactor 1 through a standpipe 18 provided with the usual fluidizing gas taps $t$ and controlled by a valve 19. The catalyst withdrawn from reactor 1 through line 18 intermixes with the hot mixture of regenerated catalyst and shot in heater 18 and heat is imparted to the thus withdrawn catalyst as a result of this mixture. Recycle gas is charged to heater 17 via line 20 and the flow of this gas through the heater is so controlled as to cause a separation of the heavier and larger shot from the catalyst, the shot descending into the lower section 21 of the heater, whereas, the catalyst is removed overhead by elutriation and carried in suspension through line 22 into the reactor. The shot separated from the catalyst is withdrawn from bottom section 21 of heater 17 through a standpipe 23, carrying the usual gas taps $t$ for fluidity purposes and also is provided with a flow control valve 23. The shot is charged into a stream of air flowing in line 24 and carried back into regenerator 5 for further heating.

The cycle continues in the manner indicated and thus heat is transferred from the regenerator to the reactor through the agency of a circulating shot which does not, however, contact the oil and which heat transfer process is further characterized in that cooling means may be omitted from the regenerator, thus making full use in the system of all of the heat released during the regeneration.

In order further to explain the invention, the following conditions are set forth:

*Conditions in reactor 1*

|  | Broad Range | Preferred Range |
|---|---|---|
| Catalyst, 10% molybdenum oxide on 90% alumina by weight_____microns__ | 20–300 | 40–150 |
| Temperature_____° F__ | 825–1,050 | 900–950 |
| Pressure_____p. s. i. g__ | 10–500 | 175–250 |
| Catalyst to Oil Ratio_____ | .2–8 | .8–1.5 |
| Cubic feet of recycle gas per barrel of oil fed to the reactor_____ | 2,000–10,000 | 3,000–5,000 |
| Concentration of hydrogen to recycle gas_____ | 50–95 | 60–70 |

Conditions in the regenerator

|  | Broad Range | Preferred Range |
| --- | --- | --- |
| Temperature_____° F__ | 900–1,200 | 1,100–1,175 |
| Pressure_____p. s. i. g__ | 10–500 | 175–250 |
| Weight ratio of shot to catalyst_____ | 1 to 8 | 3 to 5 |
| Residence time of catalyst in shot regeneration_____minutes__ | 2 to 40 | 5 to 15 |
| Particle size of catalyst_____microns__ | 20–300 | 40–150 |
| Particle size of shot_____do____ | 200–1,000 | 400–600 |
| Chemical composition of shot_____ | (¹) | (²) |

¹ Copper, iron, stainless steel, Monel, mullite, alumina, TiO₂.
² Mullite, alumina, TiO₂.

Conditions in heater

|  | Broad Range | Preferred Range |
| --- | --- | --- |
| Temperature_____° F__ | 1,000–1,200 | 1,100–1,175 |
| Pressure_____p. s. i. g__ | 10–500 | 175–250 |
| Weight ratio of regenerated catalyst to catalyst from reactor_____ | 1 to 6 | 3 to 5 |
| Weight ratio of shot to catalyst from reactor___ | 1 to 3 | 1 to 2 |

To recapitulate briefly, the present invention involves improvements in supplying heat to a hydroforming operation which, as is well known, is a highly endothermic reaction. It is a reaction in which one of the problems, and perhaps one of the most difficult problems, is that of supplying heat to the reactor in an efficient and feasible manner. An outstanding attribute of the present invention resides in the fact that this invention transfers heat from the regenerator to the reactor without contacting the oil undergoing hydroforming, and consequently, the oil is preserved against degradation by contact with this heat-carrying material or shot, and the reactor volume is not increased.

Numerous modifications of the present invention will be apparent to those who are skilled in the art without departing from the spirit thereof.

What is claimed is:

1. The method of hydroforming naphthas in a system comprising a reaction zone and a catalyst regeneration zone in which a powdered hydroforming catalyst is present in the form of a dense fluidized bed in each of said zones and further in which the naphtha is treated in the presence of the hydroforming catalyst and added hydrogen under hydroforming conditions of temperature and pressure, and the catalyst is regenerated in the regeneration zone by treatment with an oxygen-containing gas whereby heat is produced, the improvement which comprises transferring the heat formed during the regeneration in the regeneration zone to the hydroforming zone by mixing a powdered shot with the catalyst undergoing regeneration in the regeneration zone, whereby the shot acquires a portion of the heat, withdrawing a mixture of shot and regenerated catalyst from the regeneration zone and conducting it to a separate heating zone, withdrawing reactor catalyst from the hydroforming zone, mixing the withdrawn reactor catalyst with the regenerated catalyst and the shot in the heating zone whereby the catalyst withdrawn from the hydroforming zone acquires heat without contact with oxygen-containing regeneration gases, separating the catalyst from the shot and returning the thus separated and heated catalyst to the hydroforming zone.

2. The method set forth in claim 1 in which the powdered shot is of a material selected from the class consisting of copper, iron, stainless steel, Monel metal, mullite, alumina and titania.

3. The method set forth in claim 1 in which the catalyst has a particle size of from 40–150 microns, whereas, the shot has a particle size of from 400–600 microns.

4. The method set forth in claim 1 in which the catalyst is a VI group metal oxide carried on alumina.

5. The method set forth in claim 1 in which a temperature of from about 1100°–1175° F. is maintained in the regeneration zone.

6. In the method of hydroforming naphthas in a system comprising a reaction zone and a catalyst regeneration zone in which a powdered hydroforming catalyst is present in the form of a dense fluidized bed in each of said zones and further in which the naphtha is treated in the presence of the hydroforming catalyst and added hydrogen under hydroforming conditions of temperature and pressure, and the catalyst is regenerated in the regeneration zone by treatment with an oxygen-containing gas in a process in which substantially all of the heat generated in the said regeneration zone is retained in the said system, the improvement which comprises transferring the heat formed during the regeneration in the regeneration zone to the hydroforming zone by mixing a powdered shot with the catalyst undergoing regeneration in the regeneration zone, whereby the shot acquires a portion of the heat, withdrawing a mixture of shot and regenerated catalyst from the regeneration zone and conducting it to a separate heating zone, withdrawing reactor catalyst from the hydroforming zone, mixing the latter with the regenerated catalyst and the shot in the said separate heating zone whereby the reactor catalyst withdrawn from the hydroforming zone acquires heat without contact with oxygen-containing regeneration gases, separating the catalyst from the shot and returning the thus separated and heated catalyst to the hydroforming zone.

7. The method set forth in claim 6 in which the weight ratio of shot to reactor catalyst in the said separate heating zone is from about 1 to 3 parts of shot per part of reactor catalyst.

8. The method set forth in claim 6 in which the weight ratio of regenerated catalyst to catalyst from the reactor in the heating zone is from 1 to 6 parts of regenerated catalyst to one part of reactor catalyst.

9. The method set forth in claim 6 in which a temperature of from about 1100°–1175° F. is maintained in the regeneration zone.

10. In the method of hydroforming naphthas in a system comprising a reaction zone and a catalyst regeneration zone in which a powdered hydroforming catalyst is present in the form of a dense fluidized bed in each of said zones and further in which the naphtha is treated in the presence of the hydroforming catalyst and added hydrogen under hydroforming conditions of temperature and pressure, and the catalyst is regenerated in the regeneration zone by treatment with an oxygen-containing gas in the absence of extraneous cooling means, the improvement which comprises transferring the heat formed during the regeneration in the regeneration zone to the hydroforming zone by mixing a powdered shot with the catalyst undergoing regeneration in the regeneration zone, whereby the shot acquires a portion of the heat, withdrawing a mixture of shot and regenerated catalyst from the regeneration zone and conducting it to a separate heating zone, withdrawing reactor catalyst from the hydroforming zone, mixing the latter with the regenerated catalyst and the shot in the said separate heating zone whereby the reactor catalyst withdrawn from the hydroforming zone acquires heat without contact with oxygen-containing regeneration gases, separating the catalyst from the shot, returning the thus separated and heated catalyst to the hydroforming zone and returning the shot thus separated to the regeneration zone.

11. The method set forth in claim 10 in which the weight ratio of shot to reactor catalyst in the said separate heating zone is from about 1 to 3 parts of shot per part of reactor catalyst.

12. The method set forth in claim 10 in which a temperature of from about 1100°–1175° F. is maintained in the regeneration zone.

References Cited in the file of this patent

UNITED STATES PATENTS

| | | |
|---|---|---|
| 2,393,909 | Johnson | Jan. 29, 1946 |
| 2,400,176 | Thiele | May 14, 1946 |
| 2,412,025 | Zimmerman | Dec. 3, 1946 |